United States Patent
Artelsmair et al.

(10) Patent No.: US 10,529,227 B2
(45) Date of Patent: Jan. 7, 2020

(54) METHOD FOR DATA TRANSMISSION IN THE CASE OF A RESISTANCE WELDING CURRENT SOURCE AND RESISTANCE WELDING CURRENT SOURCE FOR CARRYING OUT THE METHOD

(71) Applicant: FRONIUS INTERNATIONAL GMBH, Pettenbach (AT)

(72) Inventors: Bernhard Artelsmair, Pettenbach (AT); Martin Hoertenhuber, Eberstalzell (AT)

(73) Assignee: Fronius International GmbH, Pettenbach (AT)

( * ) Notice: Subject to any disclaimer, the term of this patent is extended or adjusted under 35 U.S.C. 154(b) by 55 days.

(21) Appl. No.: 15/774,342

(22) PCT Filed: Nov. 7, 2016

(86) PCT No.: PCT/EP2016/076839
§ 371 (c)(1),
(2) Date: May 8, 2018

(87) PCT Pub. No.: WO2017/080954
PCT Pub. Date: May 18, 2017

(65) Prior Publication Data
US 2019/0340918 A1 Nov. 7, 2019

(30) Foreign Application Priority Data
Nov. 9, 2015 (EP) ..................................... 15193612

(51) Int. Cl.
*G08C 17/04* (2006.01)
*G08C 19/16* (2006.01)
*B23K 11/24* (2006.01)

(52) U.S. Cl.
CPC ............ *G08C 17/04* (2013.01); *B23K 11/241* (2013.01); *G08C 19/16* (2013.01)

(58) Field of Classification Search
None
See application file for complete search history.

(56) References Cited

U.S. PATENT DOCUMENTS

| | | | |
|---|---|---|---|
| 4,403,132 A | 9/1983 | Sugimoto | |
| 5,357,078 A * | 10/1994 | Smith | B23K 9/091 |
| | | | 219/130.51 |

(Continued)

FOREIGN PATENT DOCUMENTS

| | | |
|---|---|---|
| CN | 1098672 A | 2/1995 |
| CN | 1150076 A | 5/1997 |

(Continued)

OTHER PUBLICATIONS

International Search Report of PCT/EP2016/076839, dated Feb. 15, 2017.

(Continued)

*Primary Examiner* — K. Wong
(74) *Attorney, Agent, or Firm* — Collard & Roe, P.C.

(57) ABSTRACT

A data transmission method for a resistance welding current source during a welding operation generates welding pulses in an inverter with inverter switching elements cyclically with a switching frequency and pulse duration. The pulses are applied to a transformer primary side and rectified on the transformer secondary side by a rectifier with rectifier switching elements to form a resultant welding current. In a data transmission mode the impedance at the primary side is increased in the breaks in the welding operation, control pulses for initializing the data transmission mode are applied by a control device to the primary side and are detected on the secondary side. The rectifier switching elements of the secondary-side rectifier are actuated in a way corresponding (Continued)

to the data to be transmitted. The current on the primary side of the transformer is modulated with these data, and the data are thereby transmitted via the transformer.

17 Claims, 5 Drawing Sheets

(56) References Cited

U.S. PATENT DOCUMENTS

| | | | | |
|---|---|---|---|---|
| 5,436,422 | A | 7/1995 | Nishiwaki et al. | |
| 5,439,157 | A | 8/1995 | Geier et al. | |
| 5,710,696 | A * | 1/1998 | Reynolds | B23K 9/1043 363/132 |
| 5,748,462 | A | 5/1998 | Moro et al. | |
| 6,259,059 | B1 * | 7/2001 | Hsu | B23K 9/0735 219/130.31 |
| 6,797,922 | B2 | 9/2004 | Katooka et al. | |
| 8,658,940 | B2 * | 2/2014 | Reynolds | B23K 9/1087 219/132 |
| 9,737,950 | B2 * | 8/2017 | Vogel | H02M 3/157 |
| 2005/0056621 | A1 | 3/2005 | Niwa | |
| 2014/0313679 | A1 | 10/2014 | Artelsmair et al. | |

FOREIGN PATENT DOCUMENTS

| | | |
|---|---|---|
| CN | 1453927 A | 11/2003 |
| CN | 1709628 A | 12/2005 |
| CN | 202137505 U | 2/2012 |
| CN | 203851058 U | 9/2014 |
| DE | 10 2011 079827 A1 | 1/2013 |
| EP | 2 913 136 A1 | 9/2015 |
| FR | 2 487 712 A1 | 2/1982 |
| JP | S5752578 A | 3/1982 |
| JP | S58112673 A | 7/1983 |
| JP | 3691797 B2 | 9/2005 |
| JP | 5709247 B2 | 4/2015 |
| JP | 2016005847 A | 1/2016 |

OTHER PUBLICATIONS

European Search Report in EP 15193612.7-1702, dated Jun. 7, 2016, with English translation of relevant parts.

* cited by examiner

METHOD FOR DATA TRANSMISSION IN THE CASE OF A RESISTANCE WELDING CURRENT SOURCE AND RESISTANCE WELDING CURRENT SOURCE FOR CARRYING OUT THE METHOD

CROSS REFERENCE TO RELATED APPLICATIONS

This application is the National Stage of PCT/EP2016/076839 filed on Nov. 7, 2016, which claims priority under 35 U.S.C. § 119 of European Application No. 15193612.7 filed on Nov. 9, 2015, the disclosure of which is incorporated by reference. The international application under PCT article 21(2) was not published in English.

The invention relates to a method for data transmission in a resistance-welding current source, wherein during a welding operation in an inverter with inverter switching elements, welding pulses are generated cyclically with a switching frequency and a pulse duration and applied to the primary side of a transformer and are rectified by a rectifier using rectifier switching elements on the secondary side of the transformer to give a resulting welding current.

Furthermore, the invention relates to a resistance-welding current source, having an inverter with inverter switching elements for generating welding pulses cyclically with a switching frequency and a pulse duration during a welding operation, which inverter is connected to the primary side of a transformer, and to a rectifier connected to the secondary side of the transformer using rectifier switching elements for generating a welding current.

Figure 1:
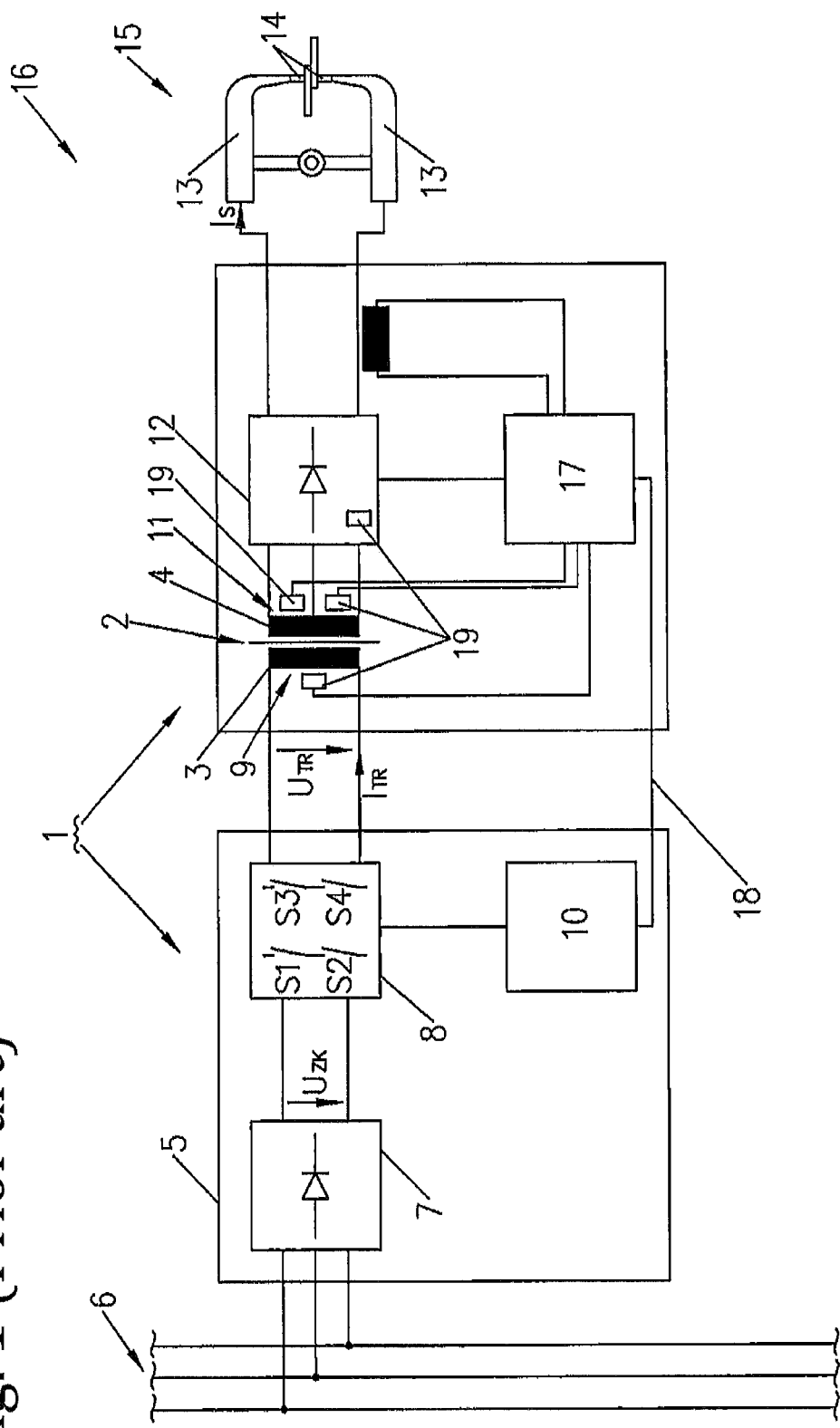

Resistance-welding current sources are known for providing a welding current, which is supplied to a welding gun. One example for a known resistance-welding current source with welding gun connected thereto is shown in FIG. 1, which shows a schematic block diagram of the prior art.

The resistance-welding current source 1 contains a transformer 2 having at least one primary coil 3 and at least one secondary coil 4. A power unit 5 is provided for generating the primary-side current $I_{TR}$ of the transformer 2, which power unit is arranged between a supply network 6 and the transformer 2. The power unit 5 also has a primary rectifier 7 coupled to an inverter 8. During welding operation, the inverter 8 applies welding pulses to the primary side 9 of the transformer 2 with the aid of the inverter switching elements S1, S2, S3, S4 thereof. The inverter control 10 of the power unit 5 ensures that the welding pulses are generated with a certain switching frequency and pulse duration in accordance with the predetermined welding current $I_S$. The current transmitted by the transformer 2 is rectified on the secondary side 11 of the transformer 2 by a rectifier 12 with rectifier switching elements and supplied to the welding-gun arms 13 or electrodes 14 of the welding gun 15 of the resistance-welding device 16. A rectifier control 17 is provided for controlling the rectifier 12, which rectifier control applies corresponding control signals to the rectifier switching elements. In addition, there is a data line 18 from the transformer 2 or the rectifier control 17 to the power unit 5, in order to notify the same of information, such as for example the temperature of transformer 2, coil and/or rectifier switching elements. In FIG. 1, temperature sensors 19 are for example arranged on the primary coil 3, secondary coil 4 and rectifier switching elements. In particular, in the event of overload or malfunctions, cost-intensive damage to the transformer 2 and secondary-side rectifier 12 can be prevented. This data transmission can take place by means of a data bus, however, owing to the few signals and low information density, only one direct connection between sensors and power unit 5 are often also used.

Owing to the amplitude of the welding current $I_S$ usually in the region of a few kA, in spite of large cross sections of the lines between transformer and electrodes, correspondingly high Ohmic losses occur. Accordingly, the transformer is arranged close to the welding gun, advantageously even directly on the welding gun. As the welding gun is usually mounted in a movable manner on a robot, the power unit is arranged separately from the transformer. On the one hand so that the robot is not loaded even further with the weight of the power unit, which under certain circumstances would cause lower accelerations and therefore slower movements. On the other hand, an attempt is made to design the welding gun to be as small as possible, in order, even in the case of complex workpiece geometries, to achieve good accessibility to the welding points and not to limit the manoeuvrability of the robot. For this reason also, the arrangement of the power unit directly on the welding gun is avoided.

The distances between power unit and transformer may be up to 20 m, depending on the total system and on the field of use, and the outlay resulting from the data lines is not to be ignored. In addition, these data lines are at least partially exposed to the rough operating conditions of the welding environment, which may lead to errors in transmission, damage and consequently to downtimes of the system.

The invention is therefore based on the object, starting from the prior art indicated at the beginning, of creating a method for data transmission in a resistance-welding current source and a resistance-welding source for carrying out the method, which can dispense with data lines between power unit and transformer and nonetheless ensure high operational reliability.

The invention achieves the set object with regards to the method in that in a data-transmission mode, in the pauses of welding operation, the impedance present at the primary side of the transformer is increased, control pulses for initializing the data-transmission mode are applied by a control device to the primary side of the transformer, which control pulses are detected on the secondary side of the transformer, whereupon the rectifier switching elements of the secondary-side rectifier are actuated in accordance with the data to be transmitted, so that the current is modulated on the primary side of the transformer using these data and thus the data are transmitted via the transformer.

If, in a data-transmission mode, the impedance present on the primary side of the transformer is increased in the pauses of the welding operation, the transmission path for the welding current, namely transformer and primary-side line, can also be used for data transmission. Due to the increase of the impedance present on the primary side of the transformer, high currents are effectively prevented in the data transmission mode, as a result of which damage to the resistance-welding current source due to excessively high currents can be excluded in the data transmission mode. If, in addition, control pulses for initializing the data transmission mode are applied by a control device to the primary side of the transformer, which control pulses are detected on the secondary side of the transformer, it is possible to determine on the secondary side, that a change to the data transmission mode should take place. A signal or a control line for synchronizing the data transmission between transformer or rectifier control to the power unit can therefore be dispensed with. If the rectifier switching elements of the secondary-side rectifier are then actuated in accordance with the data to be transmitted, so that the current is modulated on the primary side of the transformer using these data, and thus the data are transmitted via the transformer, data transmission in a resistance-welding current source can be realized easily without additional data lines being required. Thus, the simultaneous actuation of the rectifier switching elements effects a secondary-side short circuit, which can be detected on the basis of the current increase on the primary side. Owing to the impedance present on the primary side, which is increased according to the invention, this secondary-side short circuit does not cause currents which are so high that they could cause damage to or even destruction of the resistance-welding current source. This use of the available components, such as the rectifier switching elements, and the available transmission path for the welding current, namely transformer and primary-side line, can, as data lines are dispensed with, simplify the design of the resistance-welding current source with simultaneously high operational reliability, for which data transmission between transformer or rectifier control and power unit represents a prerequisite.

In general, it is established that the change from welding operation to data transmission mode is usually initiated by a control device. This may be the control of the resistance-welding current source, particularly the inverter control, but also a superordinate control, which controls the resistance-welding current source and welding gun.

The method can be improved further if the control pulses are formed by actuating at least one inverter switching element. The use of at least one inverter switching element both for the formation of the welding pulses and the control pulses can reduce the component outlay of the resistance-welding current source according to the invention, as a result of which it is possible to achieve both a simpler, more cost-effective design and the high operational reliability, achieved with the data transmission.

If the impedance present on the primary side of the transformer is increased by connecting at least one coil, it is possible to limit the maximum current in the data transmission mode. In this case, a coil offers the advantage of simple producibility, in terms of manufacturing, of an impedance, even for high currents. Furthermore, the coil reduces the maximum current increase speed, as a result of which, even in data transmission mode, high operational reliability can be ensured, particularly if the data transmission takes place by means of secondary-side short circuit via the rectifier switching elements.

One advantageous design of the method results if, in the data transmission mode, the switching elements of the secondary-side rectifier are actuated multiple times one after the other to form the data to be transmitted. This can enable the transmission of data packets as opposed to the simple binary information of a single bit (0 or 1). In this case, the actuation of the rectifier switching elements can take place multiple times within a control pulse, but the division of the data to be transmitted to a plurality of control pulses is just as possible. The serial data transmission can for example be realized asynchronously with start and stop bits, but the use of a synchronous serial data transmission, in which synchronization to the control pulses takes place, is also conceivable.

The change to the data transmission mode can be detected easily on the secondary side, when the switching frequency of the control pulses for initializing the data transmission mode is increased compared to the switching frequency of the welding pulses, particularly to 20 kHz to 50 kHz. In particular, if the switching frequency in data transmission mode represents a switching frequency not used in welding operation, the data transmission mode can be detected reliably. This can consequently prevent damage to the resistance-welding current source, which could be caused by an incorrect, simultaneous actuation of the rectifier switching elements for data transmission during welding operation.

If the control pulses for initializing the data transmission mode are generated with a predefined pulse duration, particularly 2 μs to 25 μs, this can be used as a further sign for the change to the data transmission mode. In addition, the maximum current or the maximum energy can be limited during data transmission mode by means of a short pulse duration.

If a check is performed prior to the transmission of data in data transmission mode, as to whether the secondary-side current is below a limit value, an undesired change to the data transmission mode can be prevented during welding operation. Damage to the resistance-welding current source due to an undesired change to the data transmission mode can thus be prevented.

The method for data transmission in a resistance-welding current source may distinguish itself if, in the data transmission mode, measured values and/or manufacturer data are transmitted from the secondary side of the transformer to the primary side of the transformer. This may for example enable the identification of the transformer or the welding gun, as the transformer is usually attached to the welding gun. In systems where the robot arm can be equipped with different welding guns, this unique identification of the welding gun can be used in a beneficial manner in the system control. Through the transmission of measured values, the operational reliability of the resistance-welding current source can additionally be increased, as the welding-current source control receives additional measured values and data about the system, particularly about the transformer and secondary-side rectifier.

If, in data transmission mode, temperature values measured on the secondary side of the transformer are transmitted to the primary side of the transformer, overheating and overloading of transformer and rectifier can be prevented, as a result of which a reduction of the service life of the resistance-welding current source can be prevented. Thus, the temperature curve on the secondary side, particularly of the transformer and rectifier switching elements, could also be recorded, in order to draw a conclusion about the device status. Any blocked cooling channels or poor mechanical or thermal connections between cooling body and transformer rectifier switching elements to be monitored can be detected early.

The invention achieves the set object with regards to the resistance-welding current source, in that an installation is provided for increasing the impedance present on the primary side of the transformer in a data transmission mode in the pauses in welding operation, a control device for generating control pulses is provided for initializing the data transmission mode, and an arrangement for detecting the control pulses is provided on the secondary side of the transformer, whereupon the rectifier switching elements of the secondary-side rectifier can be actuated in accordance with the data to be transmitted, so that the current on the primary side of the transformer can be modulated using these data and thus the data can be transmitted via the transformer.

A resistance-welding current source constructed in this manner can be produced relatively easily and cost-effectively. With regards to the advantages achievable therewith, reference is made to the above description of the method according to the invention.

The resistance-welding current source can be improved further if the control device is connected to the inverter, so that the control pulses can be generated by actuating at least one inverter switching element. If at least one switching element and one coil are provided for increasing the impedance present on the primary side of the transformer in the data transmission mode, the maximum current can be limited in the data transmission mode. It is possible to easily differentiate between welding operation and data transmission mode if the switching frequency of the control pulses for initializing the data transmission mode is increased compared to the switching frequency of the welding pulses, particularly to 20 kHz to 50 kHz. The control pulses for initializing the data transmission mode have a predefined pulse duration, particularly 2 µs to 25 µs. This may be used for the differentiation between welding operation and data transmission mode, which, as mentioned above, can suppress malfunctions, which may lead to damage to the resistance-welding current source.

If a device for comparing the current on the secondary side of the transformer with a limit value is provided on the secondary side of the transformer, an undesired change to the data transmission mode during welding operation and damage to the resistance-welding current source resulting therefrom can be prevented.

During data transmission from the power unit to the transformer or rectifier control, a resistance-welding current source may advantageously stand out, in which the control device is constructed for forming control pulses of different pulse duration in data transmission mode for transmitting data from the primary side to the secondary side of the transformer. The control pulses of different pulse duration can be detected on the secondary side of the transformer and be used for transmitting information to the secondary side of the transformer. The information can in this case be encoded by means of the pulse duration, for example by means of two different values for the pulse duration, wherein a logical zero is assigned to one pulse duration and a logical one is assigned to the other. Binary data of any type can be transmitted in this manner. Likewise, encoding of the data with a plurality of different values for the pulse duration, which may have a different meaning or else be used for the handshake, is conceivable. Data and/or commands can therefore be transmitted to the secondary side of the transformer.

A resistance-welding current source can also stand out if temperature-sensitive switches are provided on the secondary side of the transformer. These switches can respond in the event of excessive temperature and the corresponding information can be transmitted to the primary side of the transformer for the control device in data transmission mode. In the case of a temperature-sensitive switch in particular, the information to be transmitted is particularly small, namely only one bit, and can be sent by means of a single actuation of the two rectifier switching elements. In the case of such an indicated excessive temperature, the primary-side control device can prevent a new welding operation and protect the resistance-welding current source from damage.

If temperature sensors are provided on the secondary side of the transformer, the current temperature value, but also a recorded maximum value of the temperature, can be transmitted to the primary-side control device.

Figure 3:
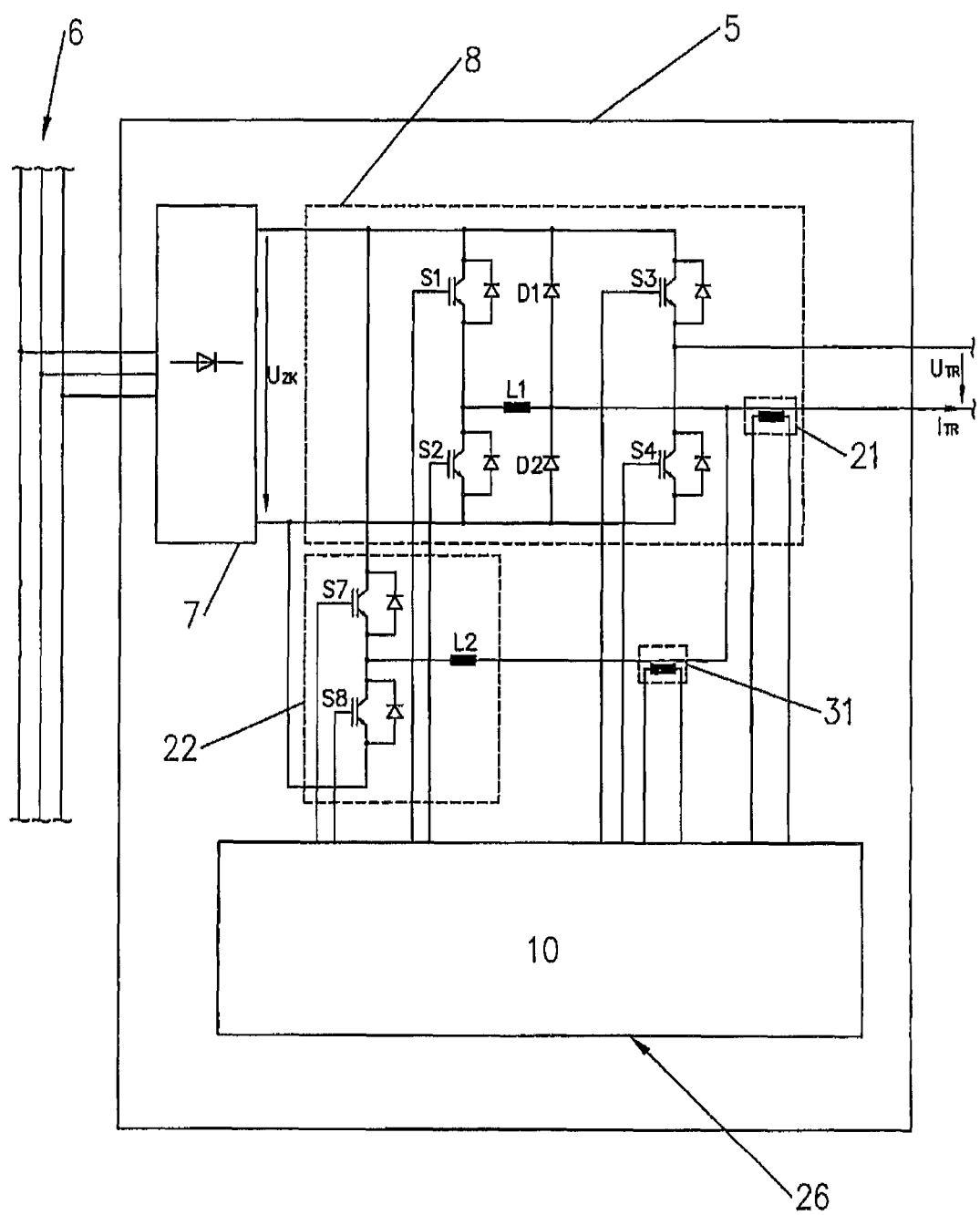
Figure 4:
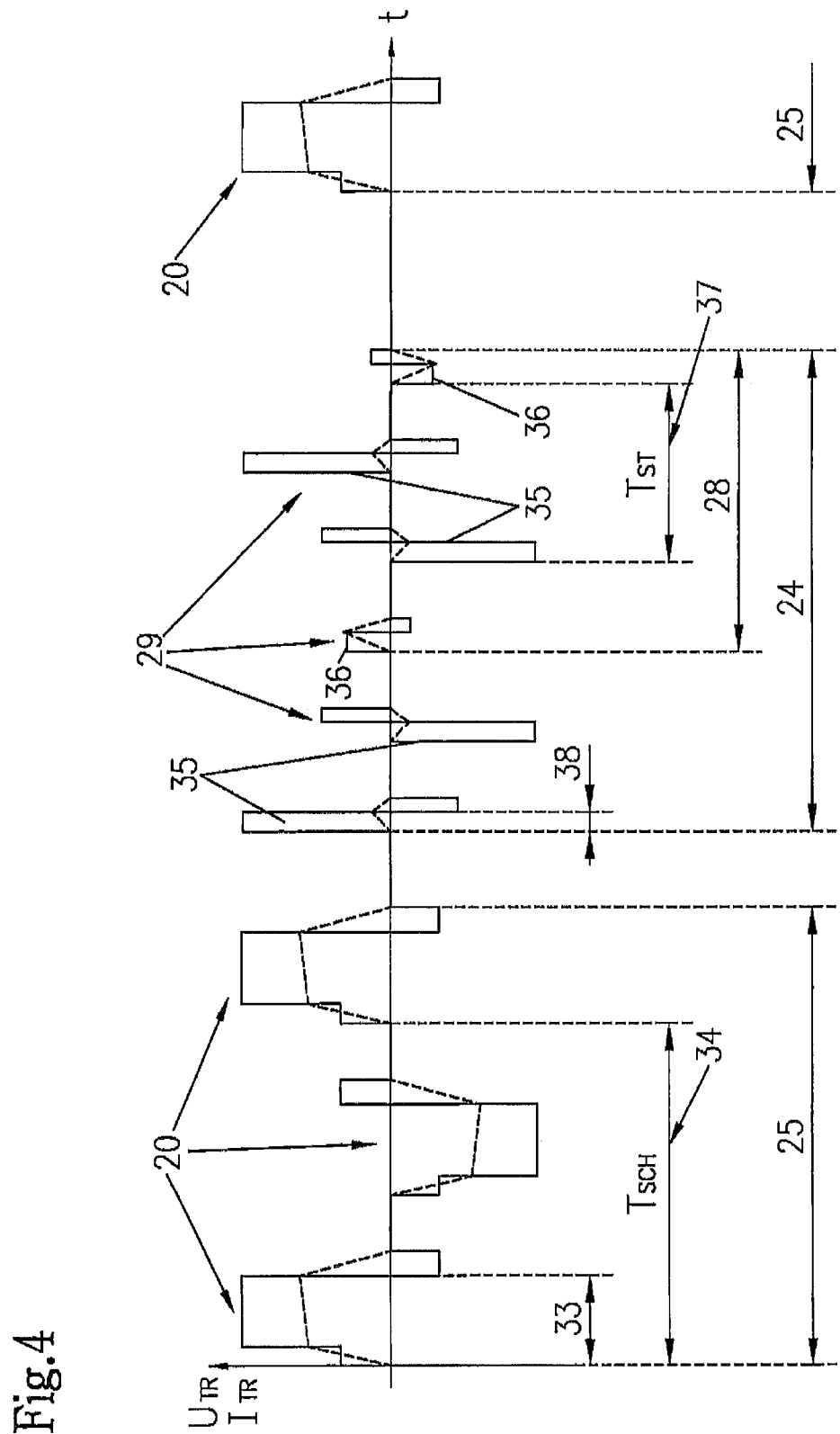
Figure 5:
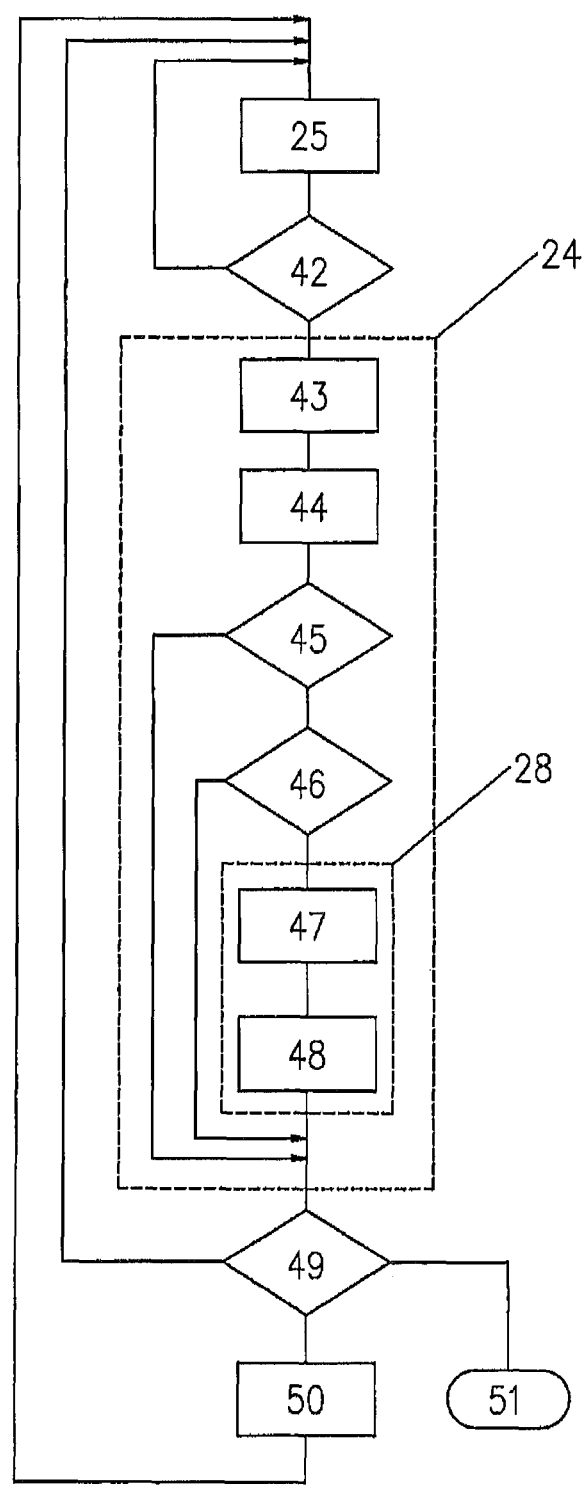

The present invention is explained in more detail in the following with reference to the figures, which show advantageous embodiments of the invention by way of example, schematically and in a non-limiting manner. In the figures FIG. 1 shows a schematic block diagram of a resistance welding device of the prior art, FIG. 2 shows a block diagram of an exemplary resistance-welding current source according to the invention, FIG. 3 shows a block diagram of an alternative design variant of the power unit of the resistance-welding current source, FIG. 4 shows the welding pulses during welding operation and control pulses in the data transmission mode, and FIG. 5 shows a flow chart of an exemplary method procedure according to the invention.

Figure 2:
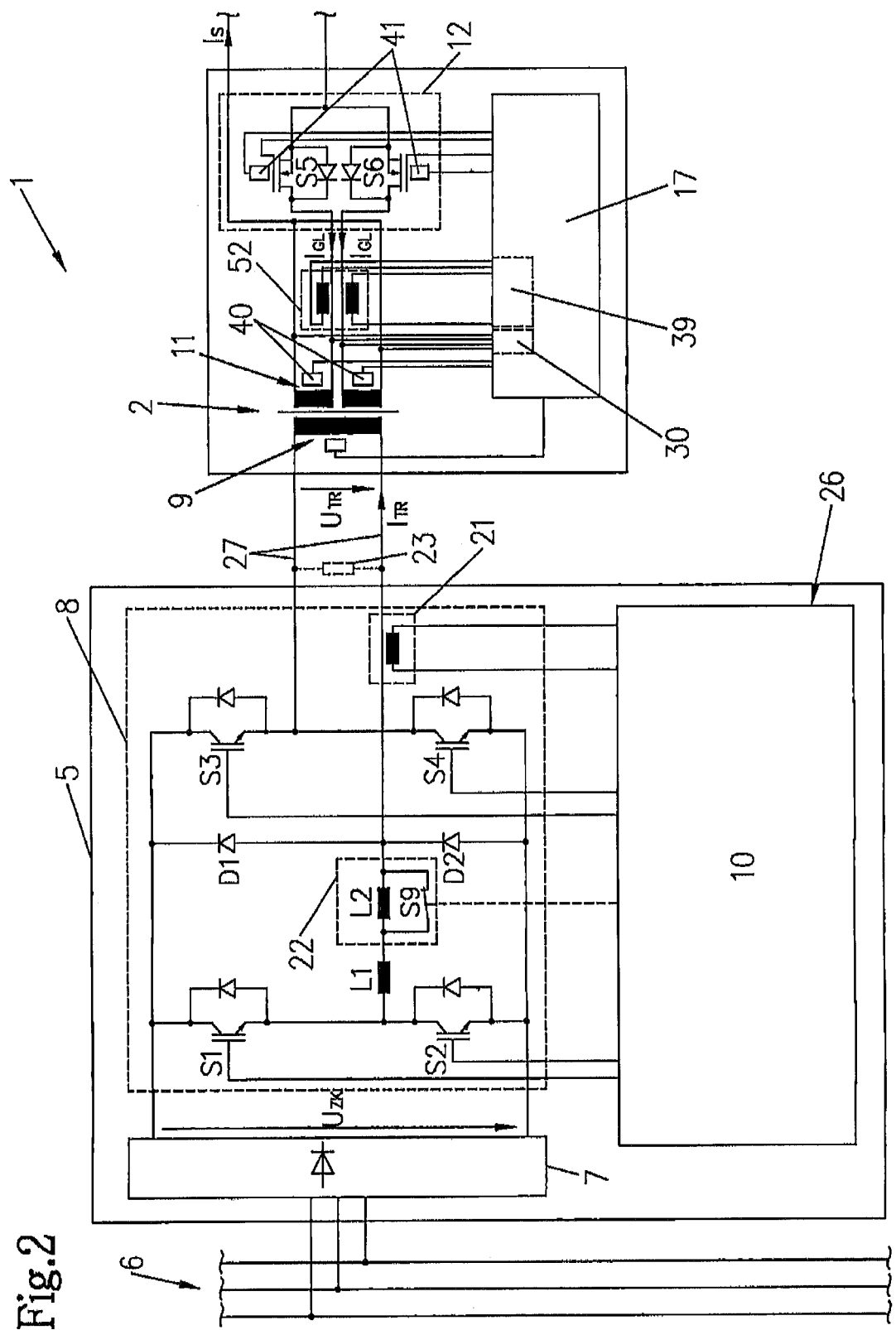

A block diagram of an exemplary resistance-welding current source 1 according to the invention is shown in FIG. 2. As can be seen, compared to the prior art according to FIG. 1, the data line 18 between power unit 5 and transformer 2 or rectifier control 17 is omitted. The principle structure of the inverter 8 can be seen in the block diagram of the power unit 5 of the resistance-welding current source 1. Four inverter switching elements S1, S2, S3, S4 with freewheeling diodes are arranged in a bridge circuit in order to generate the welding pulses 20, illustrated in FIG. 4, for the production of welding spots with the welding gun 15. In this case, a plurality of welding pulses 20 are required for the production of a welding spot. Pauses are provided between the production of the individual welding spots, among other things in order to position the welding gun 15 for the next welding spot. An inductivity L1 for limiting the maximum current increase speed and a measuring arrangement 21 for detecting the latest primary transformer current $I_{TR}$ are located in the current path to the transformer 2. Two additional diodes D1, D2 complete the bridge circuit, in order to be able to accept the current flow of the inductivity L1 after switching procedures.

In addition, compared to FIG. 1, the prior art, according to FIG. 2, an installation 22 is provided for increasing the impedance 23 present on the primary side 9 of the transformer 2. The impedance 23 drawn in dashed in FIG. 2 is in this case only to be understood symbolically, the impedance in the current path of the primary side 9 of the transformer 2 is therefore meant in the course of this disclosure. In the exemplary embodiment shown according to FIG. 2, the impedance 23 present on the primary side 9 of the transformer 2 corresponds to the initial impedance of the power unit 5. The impedance increase takes place in a data transmission mode 24 in the pauses in welding operation 25. An example for the temporal course of welding operation 25 and data transmission mode 24 is illustrated in FIG. 4. Usually, the data transmission mode 24 is initiated by a control device 26. In the illustrated example according to FIG. 2 or FIG. 3, the control device 26 of the resistance-welding current source 1 is the inverter control 10 at the same time. However, it is also conceivable, that a superordinate system control controls resistance-welding current source 1, welding gun 15 and a robot, which may be present, together, and initiates the data transmission mode 24. With the increase of the impedance 23 present on the primary side 9 of the transformer 2, the transmission path for the welding current $I_S$, namely transformer 2 and primary-side line 27, can also be used for data transmission in the pauses in the welding operation 25. This impedance increase prevents high currents in the data transmission mode 24, as a result of which the service life of the resistance-welding current source 1 is increased. In addition, the control device 26 is able to generate the control pulses 29 illustrated in FIG. 4 for initializing the data transmission mode 24. These control pulses 29 are detected by an arrangement 30 for detecting the control pulses 29 on the secondary side 11 of the transformer 2. On the secondary side 11 of the transformer 2, the change to the data transmission mode 24 can therefore be detected, without a signal or control line being required for the synchronization of the data transmission 28 between transformer 2 or rectifier control 17 to power unit 5. In the data transmission mode 24, the rectifier switching elements S5, S6 of the secondary-side rectifier 12 are then actuated in accordance with the data to be transmitted. The actuation of the rectifier switching elements S5, S6 generally takes place by means of the rectifier control 17 and causes the current $I_{TR}$ on the primary side 9 of the transformer 2 to be modulated with these data and thus the data to be transmitted via the transformer 2. A data transmission 28 from the secondary side 11 of the transformer 2 to the primary side 9 or to the power unit 5 connected thereto therefore takes place without dedicated data lines 18. In this case, the simultaneous actuation of the rectifier switching elements S5, S6 effects a secondary-side short circuit, which is reflected in a current increase on the primary side 9. This current increase is optionally detected on the primary side 9 using a measuring arrangement 21—which is already present—for detecting the primary-side welding current $I_{TR}$ or using a measuring arrangement 31—which is provided specifically therefor—as depicted in FIG. 3, and supplied to the control device 26. The control device 26 determines the data sent by the secondary side 11 on the basis of the current measured values. Owing to the impedance 23, which is increased according to the invention, on the primary side 9, the secondary-side short circuit does not cause currents which are so high that damage or even destruction of the resistance-welding current source 1 is caused. Due to the use of the present components, such as the rectifier switching elements S5, S6 and the present transmission path for the welding current $I_S$, namely transformer 2 and primary-side line 27, the structure of the resistance-welding current source 1 is simplified whilst offering high operational reliability at the same time. The high operational reliability and stability of the resistance-welding current source 1 is in this case achieved inter alia by means of the data transmission 28 between transformer 2 or rectifier control 17 and power unit 5, because as a result, overloading and overheating of the transformer 2 and rectifier 12 can be detected and prevented in time.

In the exemplary embodiment shown according to FIG. 2, the control device 26 is at the same time the inverter control 10 and therefore connected to the inverter 8. Control pulses 29 in the data transmission mode 24 can therefore be generated by actuating the inverter switching elements S1, S2, S3 and S4. In the exemplary embodiment according to FIG. 2, all four inverter switching elements S1, S2, S3 and S4 are used both for generating the welding pulses 20 and for generating the control pulses 29. By contrast, in an alternative power unit 5 according to FIG. 3, the installation 22 for increasing the impedance 23 present on the primary side 9 of the transformer 2 is used together with a half bridge S3, S4 of the inverter 8 for generating the control pulses 29 in the data transmission mode 24. In each case, one switching element S7, S8 of the additional half bridge switches the control pulse 29 to the primary side 9 of the transformer 2 at the same time as a switching element S3, S4 of the inverter 8. Due to this at least partial use of the inverter switching elements S1, S2, S3 and S4 in the data transmission mode 24, the total outlay for components for the data transmission 28 is kept low. This arrangement makes it possible, even in the power unit 5 according to FIG. 3, not to arrange the measuring arrangement 31 for detecting the current increase in the current path of the welding pulses 20. The measuring arrangement 31 therefore does not have to be designed for the high primary-side welding currents and can therefore be constructed more sensitively. This effects a higher resolution during current detection and the reduction of errors during data transmission 28.

To increase the impedance 23 present on the primary side 9 of the transformer 2 in data transmission mode 24, in accordance with FIG. 2, a switching element S9 and a coil L2 are provided. In this case, the switching element S9 is used for bridging or short-circuiting the coil L2 during welding operation 25. However, circuit arrangements according to FIG. 3 can also be used, in which the coil L2 is switched into the current path in data transmission mode 24 by means of the two switching elements S7, S8 of the additional half bridge. Even if the circuit according to FIG. 3 appears to be more complex than that illustrated in FIG. 2, the same may be convincing due to the beneficial switching elements S7, S8 for the additional half bridge. Owing to the smaller currents in the data transmission mode 24, less powerful switching elements S7, S8 can namely be used than in the case of the inverter 8 or the switching element S9 for bridging the coil L2 as used in FIG. 2, as a result of which the higher component outlay is offset. The maximum current in the data transmission mode 24 is reduced in any case in both circuit variants. In this case, the coil L2 for increasing the impedance 23 offers the advantage of simple producibility in terms of manufacturing, even for high currents. Furthermore, the connectible coil L2 reduces the maximum current increase speed, which can even ensure high operational reliability in data transmission mode 24, particularly if the data transmission 28 takes place by means of a secondary-side short circuit by means of the rectifier switching elements S5, S6.

The temporal curve of the voltage $U_{TR}$ and the current $I_{TR}$ (dashed) on the primary side 9 of the transformer 2 is illustrated in FIG. 4. The illustrated current and voltage curves in this case show an exemplary temporal sequence of the welding pulses 20 during welding operation 25 and control pulses 29 during the data transmission mode 24. In this simplified illustration, transients are certainly not shown, as these are not relevant to the invention.

During the welding operation 25, the welding pulses 20 are generated by the inverter 8. In this case, the voltage $U_{TR}$ on the primary side 9 of the transformer 2 increases in the case of conductive inverter elements S1 and S4 or S2 and S3 by way of a step. This step results due to the voltage drop at the coil L1 whilst the current $I_{TR}$ increases until the magnetic field in the transformer 2 is built up. After this current increase, the voltage $U_{TR}$ at the transformer 2 almost corresponds to the intermediate circuit voltage $U_{ZK}$ and the current $I_{TR}$ only increases further in accordance with the magnetization current of the main inductivity of the transformer 2. Accordingly, the current $I_{TR}$, which is illustrated dashed, increases, is transmitted via the transformer 2 and supplied to the electrodes as rectified welding current $I_S$. The intensity of the rectified welding current $I_S$ is regulated by means of the pulse duration 33. If the inverter switching elements S1, S4 or S2, S3 are switched off with the end of the pulse duration 33, the current $I_{TR}$ decreases and induces a negative voltage on the primary side 9 of the transformer 2. Next, the other inverter switching elements S2 and S3 or S1 and S4 are controlled and conductive, as a result of which, the described curve is repeated with reversed signs, after which the switching period $T_{SCH}$ is completed. A typical period duration $T_{SCH}$ for the welding operation 25 is approximately 100 μs, which corresponds to a switching frequency 34 of approximately 10 kHz.

Between the welding of two welding spots, data transmission 28 can take place in the pauses in the welding operation 25 in the data transmission mode 24. The control pulses 29 of the data transmission mode 24 are correspondingly illustrated in FIG. 4. As the coil L2 is connected in data transmission mode 24, the current increase $I_{TR}$ takes place in accordance with L1, L2 and the main inductivity of the transformer 2. A voltage $U_{TR}$ on the transformer 2 results depending on the dimensioning of the coils L1 and L2. One possible dimensioning would for example be to choose L1 approximately in the order of magnitude of the leakage inductivity of the transformer 2. By contrast, L2 is for example bigger than L1 by a factor 30 and approximately corresponds to a third of the main inductivity of the transformer 2. Here also, in the case of open rectifier switching elements S5, S6, a voltage $U_{TR}$ results after the end of the transient at the transformer 2, which voltage approximately corresponds to the intermediate circuit voltage $U_{ZK}$. This is the case for example in the case of the control pulses 35. By contrast, in the case of the control pulses 36, the secondary side 11 of the transformer 2 is short-circuited with the aid of the rectifier switching elements S5, S6, which causes a greater current increase. At the same time, the voltage $U_{TR}$ at the transformer 2 is considerably smaller, as the main inductivity of the transformer 2 is short-circuited by means of the rectifier switching elements S5, S6. In the exemplary implementation shown, the voltage $U_{TR}$ is approximately 30% of the intermediate circuit voltage $U_{ZK}$. The current $I_{TR}$ is detected by the control using the measuring arrangement 21 or 31. By evaluating these measured values, the data sent from the secondary side 11 of the transformer 2 can be recovered and the data transmission 28 takes place without additional data lines 18.

As illustrated, the period duration $T_{ST}$ of the control pulses 29 is shortened compared to the period duration $T_{SCH}$ of the welding pulses 20. In the illustrated example, an increased switching frequency 37 of the control pulses 29, of approximately 20 kHz, results. Particularly when initializing the data transmission mode 24, the increased switching frequency 37 helps to differentiate between welding operation 25 and data transmission mode 24. If namely the switching frequency 37 in the data transmission mode 24 illustrates a switching frequency not used in welding operation 25, for example in the range between 20 kHz and 50 kHz, the data transmission mode 24 can clearly be detected. Thus, as a consequence, damage to the resistance-welding current source 1, which could be caused by a simultaneous actuation of the rectifier switching elements S5, S6 for data transmission 28 during welding operation 25, can be prevented.

As the pulse duration 38 of the control pulses 29 has a predefined value for initializing the data transmission mode 24, preferably in the range between 2 µs and 25 µs, this is a further feature for differentiating between welding operation 25 and data transmission mode 24. As already mentioned above, erroneous switching of the rectifier switching elements S5, S6, which could lead to damage to the resistance-welding current source 1, is prevented by means of this detection on the secondary side 11 of the transformer 2.

Generally, the dimensioning of L1 and L2 naturally also depends on the switching frequencies 34, 37 and the respective pulse duration 33, 38. Depending on the desired current increase speed and intermediate circuit voltage, L1 and L2 can be dimensioned in accordance with $$U = L\frac{di}{dt}.$$

In addition, a device 39 for comparing the current $I_{GL}$ on the secondary side 11 of the transformer 2 with a limit value is provided on the secondary side 11 of the transformer 2. The actual value of the current $I_{GL}$ is to this end detected by means of a current measuring device 52 and supplied to the device 39. In the exemplary embodiment shown according to FIG. 2, this device 39 is integrated into the rectifier control 17. Only if this limit value is not exceeded is a change to the data transmission mode 24 of the rectifier control 17 of the secondary side 11 introduced. This constitutes an additional safety measure, in order to prevent an inadvertent change to the data transmission mode 24 during welding operation 25 and damage to the resistance-welding current source 1 resulting therefrom.

For data transmission 28 from the power unit 5 to the transformer 2 or rectifier control 17, control pulses 29 of different pulse duration 38 are generated by the control device 26. Thus, in data transmission mode 24, the transmission of data from the primary side 9 to the secondary side 11 of the transformer 2 is also possible. The control pulses 29 of different pulse duration 38 are detected on the secondary side 11 of the transformer 2 and used for transmitting information to the secondary side 11 of the transformer 2. The information can in this case be encoded by means of the pulse duration 38, for example using two different values for the pulse duration 38, wherein a logical zero is assigned to one pulse duration 38 and a logical one is assigned to the other. This allows the transmission of binary data of any type. Likewise, encoding of the data with a plurality of different values for the pulse duration 38, which may have a different meaning or else be used as a handshake, is conceivable. Commands, such as for example "Send serial number", "Send maximum temperature value", "Reset maximum temperature value", configuration data and the like are transmitted to the secondary side 11 of the transformer 2.

In addition, temperature-sensitive switches 40 are provided on the secondary side 11 of the transformer 2. These are preferably arranged in the region of the transformer winding or else also on the rectifier switching elements S5, S6. The switches 40 respond in the event of excessive temperature and the corresponding information is transmitted to the primary side 9 of the transformer 2 for the control device 26 in data transmission mode 24. Advantageously, in the case of a temperature-sensitive switch 40, the information to be transmitted is particularly small, namely only one bit, and can be sent by means of a single actuation of the two rectifier switching elements S5, S6. In the case of an indicated excessive temperature, the primary-side control device 26 can then prevent new welding operation 25 and correspondingly protect the resistance-welding current source 1 from damage.

Likewise, temperature sensors 19 are provided on the rectifier switching elements S5, S6. These temperature sensors 19 can of course also be used in the region of the transformer winding. The temperature sensors 19 allow the transmission of the current temperature values, but also a recorded maximum value of the temperature, to the primary-side control device 26. Thus, the temperature curve on the secondary side 11 can also be evaluated, in order to draw a conclusion about the status of transformer 2 and/or rectifier switching elements S5, S6. Any blocked cooling channels or poor mechanical or thermal connections between cooling body and rectifier switching elements S5, S6 and transformer 2 to be monitored are detected early by means of the temperature sensors 19. Permanent damage can be prevented as a result.

An exemplary procedure of the method for data transmission 28 for a resistance-welding current source 1 is described on the basis of the flow chart in FIG. 5. In order, during welding operation 25, to be able to provide the necessary high currents $I_S$ to the welding gun 15, a rectified input voltage is supplied to the inverter 8. During welding operation 25, the inverter 8 generates welding pulses 20 with a switching frequency 34 and a pulse duration 33, which pulses are applied to the primary side 9 of the transformer 2. In this case, the switching frequency 34 moves, usually in a range from 1 kHz to 15 kHz, whilst the pulse duration 33 is dependent on the workpiece to be welded or the required welding current $I_S$. The transmitted welding pulses 20 are then rectified on the secondary side 11 of the transformer 2 by rectifier switching elements S5, S6 of a rectifier 12 to give a resultant welding current $I_S$. In this case, the welding process is monitored and controlled by a control device 26, which is arranged inside the resistance-welding current source 1 in the exemplary embodiment shown and at the same time carries out the inverter control 10. However, depending on the system configuration, the welding process can also be controlled using a superordinate system control, which exchanges data and commands with the inverter control 10. If the current welding spot is finished, this control device 26 can initiate the transition to the data transmission mode 24 in pauses of the welding operation 25. To this end, a query 42 is carried out as to whether data should be detected by the secondary side 11 of the transformer 2 or the secondary-side rectifier control 17. If data should be transmitted, the impedance 23 present on the primary side 9 of the transformer 2 is increased in a step 43 for transition into the data transmission mode 24. In addition, in a further step 44, control pulses 29 for initializing the data transmission mode 24 are applied by the control device 26 to the primary side 9 of the transformer 2. Subsequently, the control pulses 29 are detected on the secondary side 11 of the transformer 2. In the exemplary embodiment shown, this takes place by means of the secondary rectifier control 17. The detection 45 of the data transmission mode 24 can for example be carried out by means of the switching frequency 37 and/or the pulse duration 38. However, the use of the amplitude of the transformer voltage $U_{TR}$ as a distinguishing criterion for welding operation 25 is also conceivable. In an optional query 46, various other criteria, which are described in more detail below, can also be checked, in order to ensure that the resistance-welding current source 1 is in the data transmission mode 24. If the conditions are fulfilled, the rectifier switching elements S5, S6 of the secondary-side rectifier 12 are actuated for data transmission 28 in step 47 in accordance with the data to be transmitted. The simultaneous actuation of the rectifier switching elements S5, S6 effects a secondary-side short circuit of the transformer 2. This modulates the current $I_{TR}$ on the primary side 9 of the transformer 2 with the data to be transmitted and thus, the data are transmitted via the transformer 2. In this case, the impedance 23, which is increased according to the invention, present on the primary side 9, prevents excessively high currents, which could cause damage or even destruction of the resistance-welding current source 1. The current increase on the primary side 9 is detected and evaluated in the next step 48. In the query 49, a possible error notification from the secondary side 11 of the transformer 2 or the rectifier control 17 is detected and error handling is correspondingly carried out. This may constitute a warning 50 to an operator, but it is likewise also conceivable to block the return to welding operation 25 and to stay in the error state 51. Otherwise, the return to welding operation 25 takes place and the resistance-welding current source 1 is ready for the next welding spot. Thus, this method allows the use of present components, such as the rectifier switching elements S5, S6 and the present transmission path for the welding current $I_S$, namely transformer 2 and primary-side line 27 for data transmission 28. The overall structure is correspondingly simplified, as it is possible to dispense with data lines 18 between secondary-side rectifier control 17 or secondary side 11 of the transformer 2 and power unit 5.

To transmit data packets, the switching elements S5, S6 of the secondary-side rectifier 12 are actuated multiple times one after the other to form the data to be transmitted. In this case, the actuation of the rectifier switching elements S5, S6 can take place multiple times within a control pulse 35, 36, but the division of the data to be transmitted to a plurality of control pulses 35, 36 is just as possible. As, according to the invention, only one present line 27 is available for data transmission 28, the data transmission 28 of data packets has to take place serially. The serial data transmission 28 can for example be realized asynchronously with start and stop bits, but a synchronous serial data transmission 28, in which synchronization to certain control pulses 35, 36 takes place for example, can also be used. Thus, in the exemplary embodiment according to FIG. 4, a data transmission 28 with 4 bits can be seen. Prior to that 2 control pulses 35 for detecting and synchronizing the data transmission mode 24 are used. Of course, the method can also be used with any desired other bit lengths or data packet sizes. Likewise, it is conceivable that the first control pulse 36 is used with actuated rectifier switching elements S5, S6 for synchronization.

As already mentioned above, the change to the data transmission mode 24 can also be detected on the secondary side 11 by means of the checking of various queries 46. If the switching frequency 37 of the control pulses 29 for initializing the data transmission mode 24 is increased compared to the switching frequency 34 of the welding pulses 20, this can be detected on the secondary side 11 by the rectifier control 17. For example, the usual switching frequency 34 of the welding pulses 20 lies in the range between 1 and 15 kHz. To initialize the data transmission mode 24, the switching frequency 37 is increased, for example into the range between 20 kHz and 50 kHz. This change to the data transmission mode 24 is easily detectable if the increased switching frequency 37 constitutes a switching frequency, which is not used in welding operation 25. A reliable detection of the data transmission mode 24 is therefore ensured, which, as a consequence, prevents damage to the resistance-welding current source 1, which could be caused by a simultaneous actuation of the rectifier switching elements S5, S6 for data transmission 28 during welding operation 25.

Control pulses 29 with a predefined pulse duration 38 are also suitable for initializing the data transmission mode 24. This predefined pulse duration 38 can be used as a further criterion for the change to the data transmission mode 24.

In addition, a check is carried out prior to the transmission of data in the data transmission mode 24, as to whether the secondary-side current $I_{GL}$ is below a limit value. A change to the data transmission mode 24 during welding operation 25 caused by a malfunction is therefore suppressed, which prevents damage to the resistance-welding current source 1.

Preferably, in data transmission mode 24, measured values and/or manufacturer data are transmitted from the secondary side 11 of the transformer 2 to the primary side 9 of the transformer 2. Manufacturer data may for example enable the identification of the transformer 2 or the welding gun 15, as the transformer 2 is usually attached to the welding gun 15. In systems where the robot arm can be equipped with different welding guns 15, this unique identification of the welding gun 15 may be useful in the system control. Through the transmission of measured values, the operational reliability of the resistance-welding current source 1 is additionally increased, as the control device 26 therefore receives additional measured values and data about the system, particularly about the transformer 2 and secondary-side rectifier 12.

The invention claimed is:

1. A method for data transmission in a resistance-welding current source, wherein during a welding operation in an inverter comprising a plurality of inverter switching elements, welding pulses are generated cyclically with a switching frequency and a pulse duration and applied to a primary side of a transformer and are rectified by a rectifier using a plurality of rectifier switching elements on a secondary side of the transformer to give a resulting welding current, wherein in a data-transmission mode, in pauses of the welding operation, an impedance present at the primary side of the transformer is increased, control pulses for initializing the data-transmission mode are applied by a control device to the primary side of the transformer, which control pulses are detected on the secondary side of the transformer, whereupon the plurality of rectifier switching elements of the secondary-side rectifier are actuated in accordance with the data to be transmitted, so that the current is modulated on the primary side of the transformer using these data and thus the data are transmitted via the transformer.

2. The method according to claim 1, wherein the control pulses are formed by actuating at least one inverter switching element of the plurality of inverter switching elements.

3. The method according to according to claim 1, wherein the impedance present on the primary side of the transformer is increased by connecting at least one coil.

4. The method according to claim 1, wherein in the data transmission mode, the plurality of rectifier switching elements of the secondary-side rectifier are actuated multiple times one after the other to form the data to be transmitted.

5. The method according to claim 1, wherein the switching frequency of the control pulses for initializing the data transmission mode is increased compared to the switching frequency of the welding pulses, and/or the control pulses for initializing the data transmission mode are generated with a predefined pulse duration.

6. The method according to claim 1, wherein a check is carried out prior to the transmission of data in the data transmission mode, as to whether the secondary-side current is below a limit value.

7. The method according to claim 1, wherein in data transmission mode, measured values and/or manufacturer data are transmitted from the secondary side of the transformer to the primary side of the transformer.

8. The method according to claim 1, wherein in data transmission mode, temperature values measured on the secondary side of the transformer are transmitted to the primary side of the transformer.

9. The method according to claim 1, wherein the switching frequency of the control pulses for initializing the data transmission mode is increased to 20 kHz to 50 kHz and/or the control pulses for initializing the data transmission mode are generated with a predefined pulse duration of 2 μs to 25 μs.

10. A resistance-welding current source, having an inverter comprising a plurality of inverter switching elements for generating welding pulses cyclically with a switching frequency and a pulse duration during a welding operation, which inverter is connected to a primary side of a transformer, and to a rectifier connected to a secondary side of the transformer using a plurality of rectifier switching elements for generating a welding current, wherein an installation is provided for increasing an impedance present on the primary side of the transformer in a data transmission mode in a pause in the welding operation, a control device for generating control pulses is provided for initializing the data transmission mode, and an arrangement for detecting the control pulses is provided on the secondary side of the transformer, whereupon the plurality of rectifier switching elements of the secondary-side rectifier can be actuated in accordance with the data to be transmitted, so that the current on the primary side of the transformer can be modulated using these data and thus the data can be transmitted via the transformer.

11. The resistance-welding current source according to claim 10, wherein the control device is connected to the inverter, so that the control pulses can be generated by actuating at least one inverter switching element of the plurality of inverter switching elements.

12. The resistance-welding current source according to claim 10, wherein at least one switching element and one coil are provided for increasing the impedance present on the primary side of the transformer in the data transmission mode.

13. The resistance-welding current source according to claim 10, wherein the switching frequency of the control pulses for initializing the data transmission mode is increased compared to the switching frequency of the welding pulses and/or the control pulses for initializing the data transmission mode have a predefined pulse duration.

14. The resistance-welding current source according to claim 10, wherein a device for comparing the current on the secondary side of the transformer with a limit value is provided on the secondary side of the transformer.

15. The resistance-welding current source according to claim 10, wherein the control device is constructed for forming control pulses of different pulse duration in data transmission mode for transmitting data from the primary side to the secondary side of the transformer.

16. The resistance-welding current source according to claim 10, wherein temperature-sensitive switches and/or temperature sensors are provided on the secondary side of the transformer.

17. The resistance-welding current source according to claim 10, wherein the switching frequency of the control pulses for initializing the data transmission mode is increased to 20 kHz to 50 kHz and/or the control pulses for initializing the data transmission mode have a predefined pulse duration of 2 μs to 25 μs.

* * * * *